(12) United States Patent
Kleinrichert (10) Patent No.: US 11,066,287 B2
(45) Date of Patent: Jul. 20, 2021

(54) NITROGEN GENERATOR AND USES THEREOF

(71) Applicant: AUTOMATIC BAR CONTROLS, INC., Vacaville, CA (US)

(72) Inventor: Charles Kleinrichert, Annapolis, MD (US)

(73) Assignee: AUTOMATIC BAR CONTROLS, INC., Vacaville, CA (US)

(*) Notice: Subject to any disclaimer, the term of this patent is extended or adjusted under 35 U.S.C. 154(b) by 0 days.

(21) Appl. No.: 16/800,317

(22) Filed: Feb. 25, 2020

(65) Prior Publication Data

US 2020/0189900 A1 Jun. 18, 2020

Related U.S. Application Data

(63) Continuation of application No. 15/997,960, filed on Jun. 5, 2018, now Pat. No. 10,752,484, which is a
(Continued)

(51) Int. Cl.
*B67D 1/04* (2006.01)
*B67D 1/00* (2006.01)
(Continued)

(52) U.S. Cl.
CPC ............ *B67D 1/0406* (2013.01); *A23F 5/243* (2013.01); *A23L 2/54* (2013.01); *B01D 53/22* (2013.01);
(Continued)

(58) Field of Classification Search
CPC .. B67D 1/0406; B67D 1/0029; B67D 1/0077; B67D 1/0021; B67D 1/004;
(Continued)

(56) References Cited

U.S. PATENT DOCUMENTS 4,597,422 A * 7/1986 Kovacevich, Jr. ....... B67D 1/04
141/85
5,004,482 A 4/1991 Haas et al.
(Continued)

FOREIGN PATENT DOCUMENTS

EP 0 411 254 A1 6/1991
EP 0 585 159 A1 3/1994
(Continued)

OTHER PUBLICATIONS

Korean Office Action dated Mar. 26, 2020 in Korean Patent Application No. 10-2020-7007852, 4 pages.
(Continued)

*Primary Examiner* — Donnell A Long
(74) *Attorney, Agent, or Firm* — Oblon, McClelland, Maier & Neustadt, L.L.P.

(57) ABSTRACT

A system and method to supply nitrogen gas is provided. Ambient air is compressed and stored in a storage receiver and then nitrogen is separated from the compressed air in a nitrogen membrane separation unit. The separated nitrogen is stored in a nitrogen storage tank under pressure and released through a pressure control valve. The system is confined to a small footprint and is useful as a nitrogen source where conventional compressed nitrogen tanks are a safety or space issue. Systems to prepare nitrogen infused beverages are also provided.

10 Claims, 6 Drawing Sheets

Related U.S. Application Data continuation of application No. 15/192,546, filed on Jun. 24, 2016, now Pat. No. 10,017,373.

(60) Provisional application No. 62/323,190, filed on Apr. 15, 2016.

(51) Int. Cl.

| | |
|---|---|
| *B67D 1/08* | (2006.01) |
| *B67D 1/10* | (2006.01) |
| *B67D 1/12* | (2006.01) |
| *B01D 53/22* | (2006.01) |
| *B01D 53/26* | (2006.01) |
| *C01B 21/04* | (2006.01) |
| *A23L 2/54* | (2006.01) |
| *C12C 13/10* | (2006.01) |
| *A23F 5/24* | (2006.01) |

(52) U.S. Cl.
CPC ........... *B01D 53/229* (2013.01); *B01D 53/26* (2013.01); *B67D 1/004* (2013.01); *B67D 1/0021* (2013.01); *B67D 1/0029* (2013.01); *B67D 1/0077* (2013.01); *B67D 1/0801* (2013.01); *B67D 1/0857* (2013.01); *B67D 1/10* (2013.01); *B67D 1/1252* (2013.01); *C01B 21/0438* (2013.01); *C12C 13/10* (2013.01); *B01D 53/265* (2013.01); *B01D 2256/10* (2013.01); *B01D 2257/104* (2013.01); *B01D 2259/4525* (2013.01); *B67D 2001/0481* (2013.01); *B67D 2001/0487* (2013.01); *B67D 2001/0827* (2013.01)

(58) Field of Classification Search
CPC ...... B67D 1/0801; B67D 1/10; B67D 1/1252; B67D 1/0857; B67D 2001/0487; B67D 2001/0481; B67D 2001/0827; A23L 2/54; C12C 13/10; A23F 5/243; C01B 21/0438; B01D 53/22; B01D 53/26; B01D 53/229; B01D 53/265; B01D 2256/10; B01D 2257/104; B01D 2259/4525
See application file for complete search history.

(56) References Cited

U.S. PATENT DOCUMENTS

| | | | |
|---|---|---|---|
| 5,097,863 A | 3/1992 | McCann et al. | |
| 5,302,189 A | 4/1994 | Barbe et al. | |
| 5,378,263 A | 1/1995 | Prasad | |
| 5,565,149 A | 10/1996 | Page et al. | |
| 5,588,984 A | 12/1996 | Verini | |
| 2007/0065555 A1 | 3/2007 | Soane et al. | |
| 2007/0125232 A1 | 6/2007 | Wrosch et al. | |
| 2007/0194045 A1 | 8/2007 | Py et al. | |
| 2008/0314062 A1 | 12/2008 | Ritchey | |
| 2009/0236361 A1 | 9/2009 | Doelman et al. | |
| 2011/0036864 A1 | 2/2011 | McKenna | |
| 2012/0000283 A1 | 1/2012 | Muse | |
| 2013/0206792 A1 | 8/2013 | Schroeder et al. | |
| 2013/0264360 A1 | 10/2013 | Astolfi | |
| 2013/0277394 A1 | 10/2013 | Edwards | |
| 2013/0314244 A1 | 11/2013 | Hershberger et al. | |
| 2015/0144660 A1 | 5/2015 | Wertheim et al. | |
| 2015/0329343 A1 | 11/2015 | Kleinrchert | |
| 2016/0222332 A1 | 8/2016 | Peirsman et al. | |
| 2016/0236926 A1 | 8/2016 | Leyva et al. | |
| 2016/0280528 A1 | 9/2016 | Kleinrichert | |
| 2016/0289617 A1* | 10/2016 | MacKenzie | B01F 15/06 |
| 2017/0064977 A1 | 3/2017 | Bischel | |
| 2017/0164643 A1 | 6/2017 | Lundberg et al. | |
| 2017/0265499 A1 | 9/2017 | Hyde et al. | |
| 2018/0221833 A1* | 8/2018 | Hyde | B01F 5/043 |
| 2018/0317699 A1 | 11/2018 | Brunner | |
| 2018/0318777 A1 | 11/2018 | Hartmann | |
| 2018/0319650 A1 | 11/2018 | Henriquez | |

FOREIGN PATENT DOCUMENTS

| | | |
|---|---|---|
| EP | 0 603 798 A1 | 6/1994 |
| JP | 2002-145396 A | 5/2002 |
| JP | 2002-527095 | 8/2002 |
| JP | 2005-082239 | 3/2005 |
| WO | WO 2015/061564 A1 | 4/2015 |
| WO | WO 2015/175244 A2 | 11/2015 |

OTHER PUBLICATIONS

Extended European Search Report dated Nov. 8, 2019, in Patent Application No. 17782872.0, 9 pages.
European Office Action dated Nov. 26, 2019, in Patent Application No. 17782872.0, 1 page.
Korean Office Action dated Jun. 18, 2019 in Korean Patent Application No. 10-2018-7029884 (with English translation), 8 pages.
Combined Chinese Office Action and Search Report dated Jan. 6, 2021 in Chinese Patent Application No. 201780023779.0 (with English translation), 14 pages.
Office Action dated Mar. 18, 2021, in Japan Patent Application No. 2018-553993, (with English-language Translation).
European Office Action dated Apr. 30, 2021, in corresponding European Patent Application No. 17 782 872.0.

* cited by examiner

SECTION B-B

NITROGEN GENERATOR AND USES THEREOF

CROSS REFERENCE TO RELATED APPLICATIONS

This application is a continuation application of prior U.S. application Ser. No. 15/997,960, filed Jun. 5, 2018, the disclosure of which is incorporated herein by reference in its entirety. U.S. application Ser. No. 15/997,960 is a continuation of prior U.S. application Ser. No. 15/192,546, filed Jun. 24, 2016, now issued as U.S. Pat. No. 10,017,373, the disclosure of which is incorporated herein by reference in its entirety. U.S. application Ser. No. 15/192,546 claims priority to U.S. Application No. 62/323,190, filed Apr. 15, 2016, the disclosure of which is incorporated herein by reference in its entirety.

FIELD OF THE INVENTION

The present invention relates to a system to provide a continuous supply of nitrogen gas located at point of utility which has a small footprint and low noise level such that it can be employed in retail, home or laboratory settings.

BACKGROUND OF THE INVENTION

Nitrogen gas is employed in many utilities in the retail, home or laboratory settings where traditional supply from storage cylinders is inconvenient and may pose a safety or space consumption issue or simply is an inconvenience. Nitrogen is employed as a small scale flush for packaging, for flushing sample containers in a laboratory or as an agent for beverage enhancement and dispense.

The inventors have discovered novel systems for preparation and dispense of nitrogen infused beverages as described in PCT/US15/28876 filed May 1, 2015 the disclosure of which is incorporated herein by reference in its entirety, in U.S. Provisional Application No. 61/993,700, filed May 15, 2014, the disclosure of which is incorporated herein by reference in its entirety and in U.S. Provisional Application No. 62/299,608, filed Feb. 25, 2016, the disclosure of which is incorporated herein by reference in its entirety. The systems described in these applications describe a nitrogen supply from tanks of compressed nitrogen. However, for utilities such as retail dispense or home use, installing and removing nitrogen cylinders is at least inconvenient and requires space consumption and is a source of safety concerns. Advancing technology has made available nitrogen generation systems wherein nitrogen is separated from the air via compression/membrane technology. However, the inventors have found that available systems having a sufficiently small footprint suitable for incorporation into a beverage dispense unit to be placed in the home or retail environment do not provide a continuous supply of nitrogen at an elevated pressure sufficient to support, for example, nitrogen infusion systems as exemplified in the previously identified applications. Moreover, systems having larger footprints which may be capable of supplying adequate nitrogen generate a high noise level which is considered unacceptable for retail and home use systems.

Therefore, there is a need for a small footprint self-contained nitrogen supply system which supplies a continuous supply of nitrogen at a pressure level sufficient to support a nitrogen infusion system while being sufficiently quiet to be acceptable for use in a retail setting.

Thus an object on the present invention is to provide a stand-alone nitrogen supply system capable of supplying nitrogen gas continuously at a pressure and rate useful for packaging flush or other such utilities.

Another object is to provide a nitrogen supply system capable of supplying nitrogen gas continuously at a pressure sufficient to support nitrogen infusion across a semi-porous or permeable membrane, which has a sufficiently small footprint to allow incorporation into a beverage dispense unit and which is quiet in operation.

A further object is to provide a convenient, cost effective system which does not require nitrogen supply from a compressed gas cylinder to infuse a broad spectrum of beverages with nitrogen and dispense the infused beverage in an attractive and facile method such that the system may be employed in a retail environment or in the home.

SUMMARY OF THE INVENTION

These and other objects are achieved by the present invention, the first embodiment of which includes a system to supply nitrogen gas, comprising:
a compressed air feed;
a nitrogen membrane separator;
a nitrogen storage unit;
a pressure control unit; and
a release valve for nitrogen from the nitrogen storage unit.

A second embodiment includes a system for preparing and dispensing a nitrogen infused beverage, comprising:
a bag-in-box beverage concentrate container;
a first diaphragm pump controlling flow of a beverage concentrate through a beverage line from the bag-in-box container to a first flow controlling needle valve and from the first needle valve through a first back check valve to a liquid mixing point,
a second diaphragm pump controlling water flow through a water line from a water supply to a liquid/gas contactor membrane unit and from the contactor unit to a second flow controlling needle valve and from the second needle valve through a second back check valve to the liquid mixing point;
a liquid gas contactor membrane unit;
nitrogen supply system capable of supplying nitrogen gas continuously at a pressure sufficient to support nitrogen infusion across a semi-porous or permeable membrane of the liquid/gas contactor membrane unit, the nitrogen supply system comprising:
a source of compressed air;
a nitrogen membrane separator;
a nitrogen storage unit;
a pressure control unit; and
a release valve for release of nitrogen from the nitrogen storage unit to the liquid gas contactor unit;
a nitrogen infused beverage line from the liquid mixing point to a beverage faucet;
wherein
the beverage faucet is a slow release faucet such that the infused beverage in the nitrogen infused beverage line remains under pressure during dispense of the beverage from the faucet, and
the nitrogen gas feed supply line to the liquid/gas contactor membrane unit comprises a check valve preventing liquid flow from the liquid/gas contactor membrane unit into the pressurized gas supply line.

In a further aspect of the invention a beverage dispense kit, comprising at least the system described in the second embodiment in a self-contained unit is provided. The self-contained dispense kit may be capable of being affixed to a wall or a panel or may be a stand-alone floor or countertop unit.

Any of the dispense systems or kits described herein may include a chiller or refrigeration unit that cools at least the bag in box beverage concentrate container and may additionally cool the water, the liquid/gas contactor membrane unit and at least a portion of the dispense tower.

In a further special aspect, the beverage faucet for the nitrogen infused beverage is a slow pour faucet optionally fitted with a restrictor nozzle or restrictor plate that allows for release of $N_2$ or $N_2/CO_2$ gas from the beverage when dispensed to a receiver.

In one embodiment, the present invention includes a method to supply nitrogen gas for utilities requiring a continuous nitrogen supply such as for example, flushing packages before sealing or flushing equipment for drying or removal of air, comprising compressing ambient air to a storage receiver; optionally filtering the air before compression to remove particulates; optionally removing condensed moisture from the condensed air; separating nitrogen from the compressed air in a nitrogen membrane separation unit, collecting the separated nitrogen in a nitrogen receiver; retaining the nitrogen in the receiver under a pressure equal to or greater than the pressure required for the intended end use of the nitrogen; and releasing the nitrogen through a pressure control valve.

In another embodiment, the present invention includes a method for preparing and dispensing a nitrogen infused liquid from the systems described in the above embodiments and further aspects thereof. The method comprises: transferring a beverage concentrate from the bag-in-box container through the first flow controlling needle valve through the first back check valve to the liquid mixing point under pressure from the first diaphragm pump, simultaneously conveying water from the water supply through the liquid side of the liquid/gas contactor membrane unit under pressure from the second diaphragm pump and supplying the nitrogen gas at a pressure of from 20 to 70 psi to a gas side of the liquid/gas contactor membrane unit;

generating nitrogen from ambient air by compressing the air and separating nitrogen from the compressed air in a nitrogen membrane separator;

storing the generated nitrogen in a nitrogen storage unit under a pressure sufficient to operate a liquid gas contactor;

supplying the nitrogen from the nitrogen storage unit to the liquid/gas contactor;

infusing the nitrogen gas into the water across the membrane of the liquid/gas contactor;

farther conveying the nitrogen infused water from the liquid/gas contactor through the second flow controlling needle valve through the second back check valve to the liquid mixing point;

mixing the beverage concentrate and nitrogen infused water at the liquid mixing point to obtain the nitrogen infused beverage;

supplying the nitrogen infused beverage under pressure to the beverage faucet; and dispensing the nitrogen infused beverage through the beverage faucet at a controlled rate to a receiver;

wherein the volume and pressure of the beverage concentrate and nitrogen infused water combined at the liquid mixing point are controlled by the first and second flow controlling needle valves respectively, and during the dispense of the nitrogen infused beverage, pressure is retained on the nitrogen infused beverage in the beverage line from the mixing point to the faucet.

In a special embodiment of the invention the dispensed beverage is nitrogen infused chilled coffee.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Throughout this description all ranges described include all values and sub-ranges therein, unless otherwise specified. Additionally, the indefinite article "a" or "an" carries the meaning of "one or more" throughout the description, unless otherwise specified.

According to the present invention the term "beverage" means any noncarbonated aqueous liquid material that is a homogeneous liquid having a flavor due to dissolved components. According to embodiments of the invention the liquid supplied as a concentrate from a bag-in-box container may contain suspended solids. As used herein the term concentrate describes any beverage in a high ingredient content form which is diluted with water to a level appropriate for consumption and enjoyment.

According to the present invention dispensing of the chilled beverage means opening a faucet of the system to allow the chilled $N_2$ infused beverage to flow from the system into a receiver such as a glass, mug or other drinking container. Throughout the following description the term "gas infused" will be employed to describe $N_2$ infused beverage.

Dispensing of the gas infused chilled beverage is an element of the present invention wherein reduction of pressure on the gas infused beverage allows escape of infused gas and results in unique properties which distinguishes the dispensed beverage by enhancement of the beverage's flavor and/or appearance.

Throughout this description, the terms nitrogen, nitrogen gas, $N_2$ and $N_2$ gas are used interchangeably and convey the same meaning unless otherwise specified. Further, nitrogen infused water may be referred to as "nitro-water" and describes water infused with nitrogen or a mixed gas. Additionally, the prepared nitrogen infused beverage may be referred to as "nitro-beverage."

Figure 1:
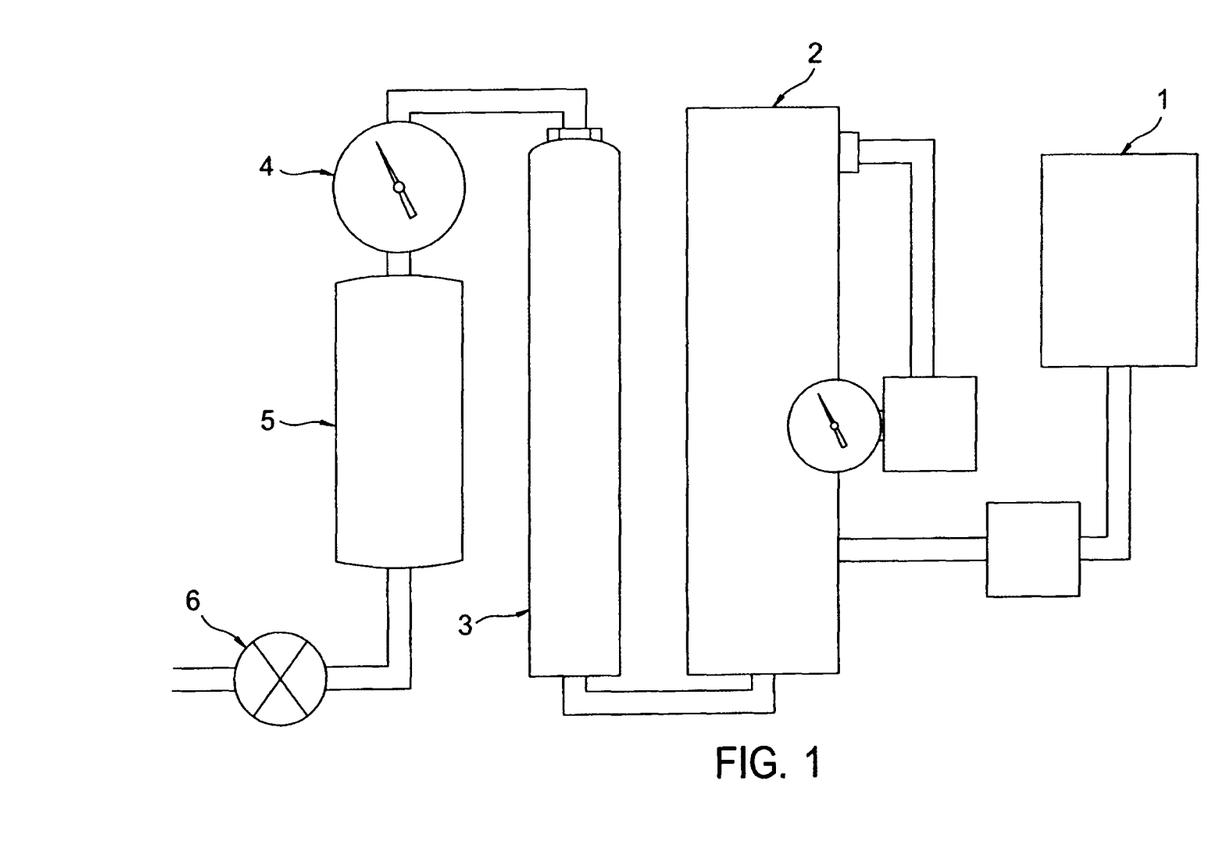
FIG. 1 is a schematic diagram of a nitrogen generator according to one embodiment of the invention.

In a first embodiment, a nitrogen generation system is provided. FIG. 1 shows a basic schematic diagram of the system containing an air compressor (1), a compressed air storage tank (2), a nitrogen membrane separator (3); a nitrogen storage unit (5); a pressure control unit (4); and a release valve for nitrogen (6) from the nitrogen storage unit.

This basic system may be modified with various controls, valves and check units as may be practiced by one of skill in the art.

Figure 2:
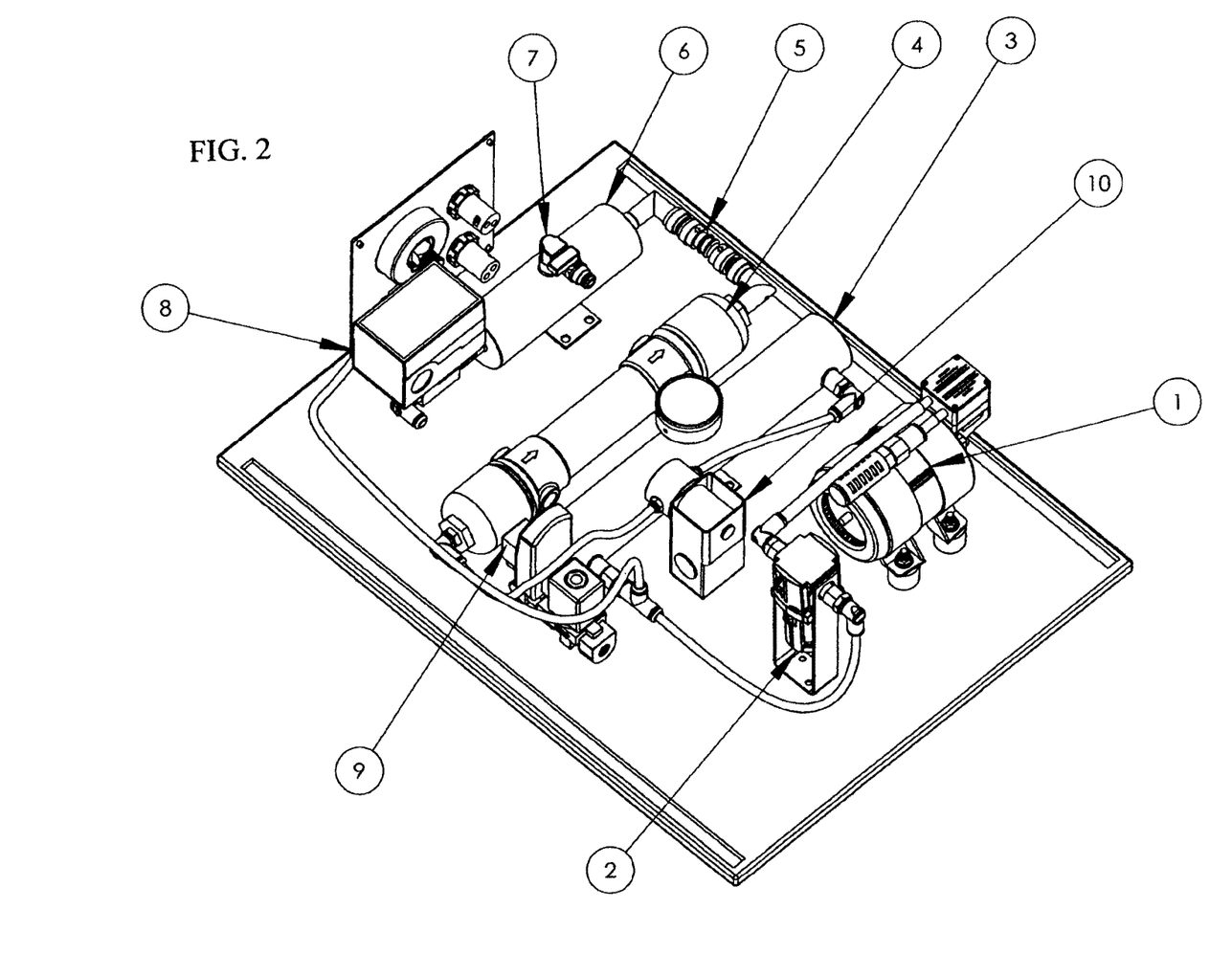
FIG. 2 is a three dimensional drawing of the nitrogen generator according to one embodiment of the invention.

In an aspect of the first embodiment, as shown in FIG. 2, further structural units are shown. Thus in FIG. 2 a air dryer (2) is inline between the air compressor (1) and the compressed air storage tank. The compressed air tank is equipped with a moisture drain (9). A back check valve (5) is located between the $N_2$ separator membrane unit and the $N_2$ storage tank (6). Pressure control (8) is shown on a control panel (not numbered) and $N_2$ outlet valve is located in a mid-tank position.

Figure 3:
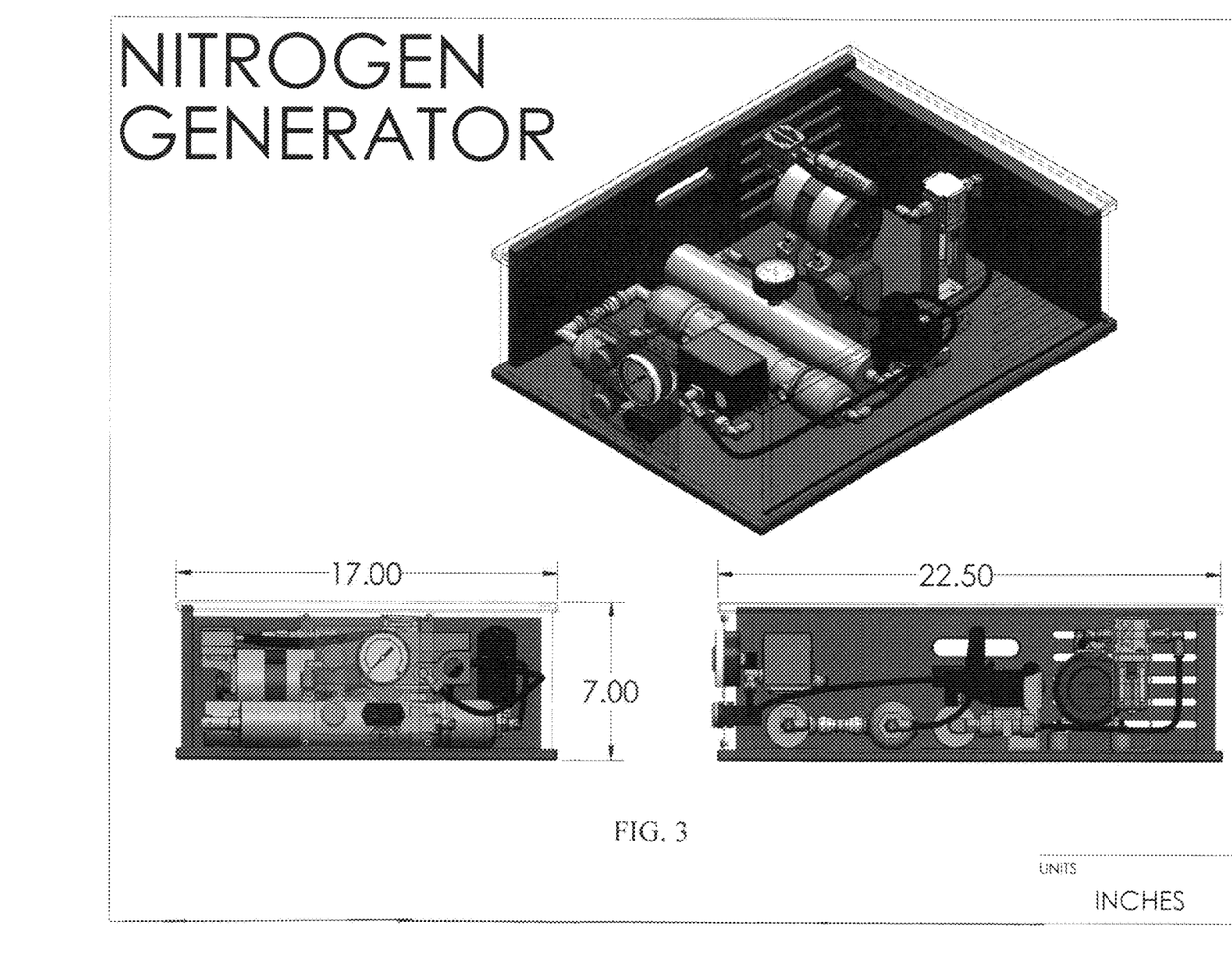
FIG. 3 is a a three dimensional drawing of the nitrogen generator according to one embodiment of the invention, showing vertical and horizontal views of the system and indicating dimensions according to one embodiment of the invention.

As indicated in the views shown in FIG. 3 the nitrogen generator of certain embodiments may have a footprint of less than four square feet and a height of less than one foot. These dimensions may vary according to volume adjustment of the compressed air tank and nitrogen storage unit. However, it is clear that the nitrogen generator may have a foot print consistent with utility in a confined space such as a counter top or lab bench.

Optional components may include a particulate filter for the air to be compressed and further drain systems to remove condensate from the compressed air. The pressure and temperature components of the system may be varied and such modification and control may be directed by one of skill in membrane separation systems.

The inventors have surprisingly discovered that by collecting and storing the $N_2$ gas obtained from the membrane separator in the storage unit under an elevated pressure, a constant and effective supply of nitrogen to operate a nitrogen liquid contactor system may be obtained. The $N_2$ pressure in the storage unit may be from 10 to 100 psi, preferably from 15 to 80 psi and most preferably from 20 to 70 psi. The volume of the storage unit may be from 10 to 100 cubic inches and may be varied to suit the requirements of the intended use of the nitrogen. The storage unit may be constructed of any material suitable for a pressure vessel as recognized by one of skill in the art. Stainless steel may be a material of choice when the generator is intended for use in a food or beverage application.

The actual dimensions and configuration of the nitrogen generator may be varied according to intended end use and supply requirement. A distinct advantage may be obtained for example as shown by the dimensions illustrated in FIG. 3. The foot print required of the generator is small enough that it may be included as part of a kit as described in the following embodiments or it may be a stand-alone unit for a bench or table-top. Accordingly, the nitrogen generator of the present invention may be useful in a wide range of utilities where conventional compressed nitrogen cylinders are inconvenient or impractical. Additionally, the nitrogen generator offers added safety and reduced maintenance requirement when employed in a retail environment.

Figure 4:
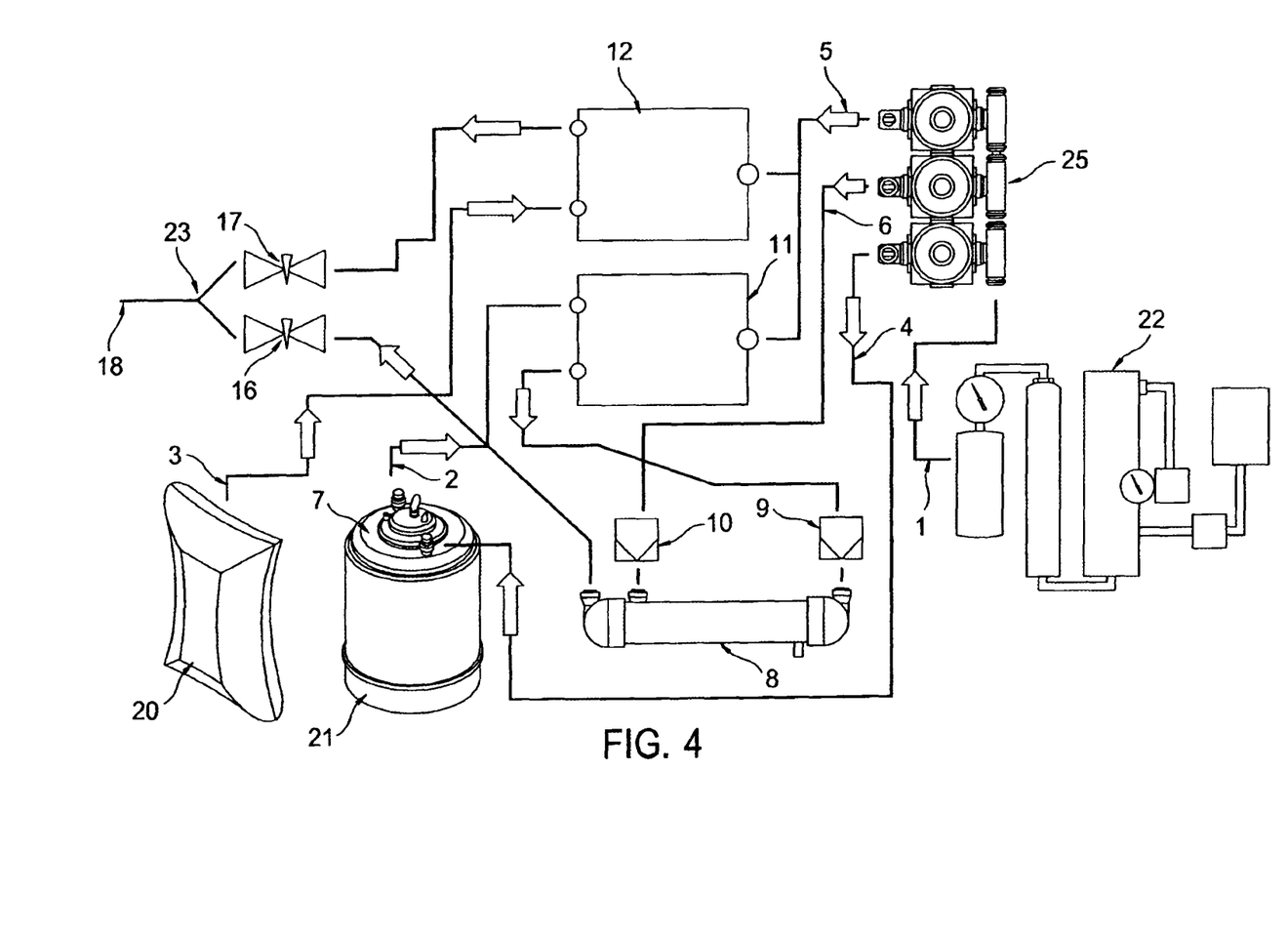
FIG. 4 shows a bag-in-box beverage concentrate based dispense system according to one embodiment of the invention.

In a second embodiment as shown schematically in FIG. 4, the present invention provides a system for preparing and dispensing a nitrogen infused beverage, comprising: a bag-in-box beverage container (20); a first diaphragm pump (12) controlling flow through a beverage line (3) from the bag-in-box container to a first flow controlling ejector (17) and from the first ejector through a first back check valve to a liquid mixing point (23), a second diaphragm pump (11) controlling water flow through a water line (2) from a water supply to a liquid/gas contactor membrane unit (8) and from the contactor unit to a second flow controlling ejector (16) and from the second ejector through a second back check valve to the liquid mixing point (23); a controlled pressurized supply of a nitrogen from the nitrogen generator (22) to the liquid/gas contactor membrane unit; the liquid/gas contactor membrane unit (8); a nitrogen infused beverage line (18) from the liquid mixing point to a beverage faucet (FIG. 5); wherein the beverage faucet is a slow release faucet such that the infused beverage in the nitrogen infused beverage line remains under pressure during dispense of the beverage from the faucet, and the nitrogen gas feed supply line to the liquid/gas contactor membrane unit comprises a check valve (10) preventing liquid flow from the liquid/gas contactor membrane unit into the pressurized gas supply line.

It is noted that for simplicity of the diagram the nitrogen generator 22 is represented by a scaled down version of FIG. 1 and therefore corresponds to the description of FIG. 1. However, the systems of FIG. 2 or variations thereof may be shown as (22).

As indicated by the above description and in FIG. 4, the mixing of the beverage concentrate and the nitrogen infused water takes place in line under pressure rather than at the dispense nozzle as would normally take place on a soda dispenser or bar gun. The carbonated water and concentrate on a soda dispense system for example would both independently be fed to a nozzle and be mixed upon pouring the beverage. According to the design of the present invention nitrogenated water is blended with the concentrate under pressure which causes a forced in line nitrogenation of the concentrate as it is mixed with the nitro-water. This takes place as a result of the back pressure "restriction" in line from the slow pour faucet which has a restrictor disc causing the necessary line pressure to achieve the infusion.

In the embodiment shown in FIG. 4, the water supply may be provided from a pressurizable container (21) pressurized with nitrogen or nitrogen mixed gas through gas line (4) from nitrogen supply (22). In this embodiment, the nitrogen is supplied through a manifold of independent gas regulators (25) to each of the diaphragm pumps (5), to the liquid/gas contactor membrane unit (6) and to the pressurizable water supply container (4). Use of a water supply container such as shown in (21) offers an advantage that both the bag-in-box beverage concentrate and the water container may be cooled by a refrigeration or chiller unit. Alternatively, all or selected individual components of the embodiments shown in FIG. 4 may be cooled by one or more refrigeration or chiller units, preferably one common cooling unit.

The system may optionally incorporate an inline strainer and/or filtration unit (not shown in FIG. 4) in the water line from the water supply to the liquid/gas contactor membrane unit in order to protect the gas permeable membranes of the liquid/gas contactor membrane unit from solids which may be present in the water.

Bag-in-box containers are commercially available in a range of volume sizes and materials of construction. Any suitable container of volume size convenient to the intended application may be employed. Generally, a container of 1 to 5 gallons is employed based on convenience of handling and size and structure of the refrigeration system to be employed. However, systems constructed for high volume dispense may be larger, for example 10 gallons or more. The box component of the container may be corrugated cardboard while the bag may be constructed of any material accepted for use in the food and beverage industry.

FIG. 4 schematically shows the arrangement of the fundamental components of the dispense systems of the present invention. However, in the construction of commercial functional units secondary components such as safety regulators, valves, couplings, harnesses, support structure and other functional components known to one of skill in the beverage dispense technology may be incorporated in the system. Such commercial arrangements are included in the present invention as long as the structural components and arrangements disclosed herein are present.

Figure 5:
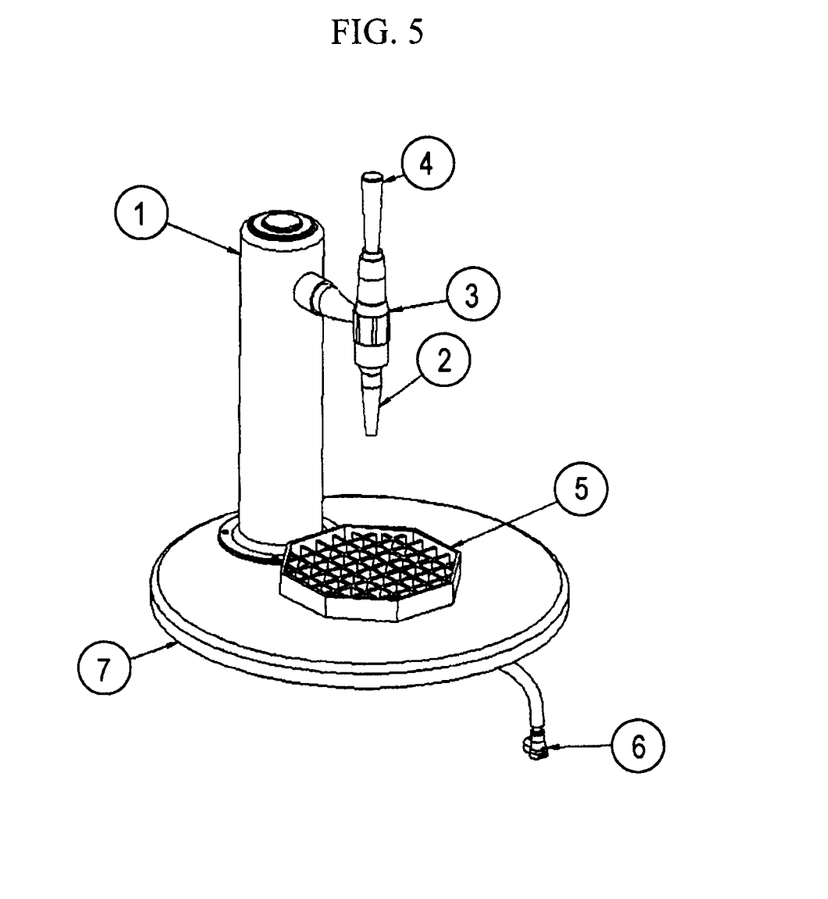
FIG. 5 is a drawing of the basic components and arrangement of dispense tower according to an embodiment of the invention.

The faucet (3) shown in FIG. 5 may be a slow pour faucet designed to dispense the chilled gas infused beverage at a controlled rate to allow foam formation upon dispense and provide the unique flavor and appearance associated with the product obtained via dispense from the system of this invention. Commercially available faucets typically employed to tap beer are suitable for use as the faucet (3).

FIG. 5 shows a schematic diagram of a faucet tower assembly (1) according to an embodiment of the invention. In a highly preferred aspect of the invention a restrictor nozzle (2) is inserted in the tip of the faucet to further enhance the foam formation during liquid dispense. Restrictor nozzles providing differing dispense characteristics are known and commercially available. Additionally, a restrictor plate may be employed in place of or in combination with the nozzle to enhance the frothing effect of the dispense system. The embodiment shown in FIG. 5 also includes a tap handle (4) which may be a decorative enhancement to the system, a drip tray (5) and quick connect coupling (6) to line (18) shown in FIG. 4. The tap handle, drip tray and quick connect coupling are commercial enhancements to the system and are not elements of the present invention.

In preferred embodiments the system is arranged or constituted in a self-contained unit or dispense kit that may be conveniently shipped to and placed in a commercial establishment for preparation and dispensation of specialty gas infused chilled beverages. It is unique in that the nitrogen supply may be included as part of the kit and a stand alone unit such as a nitrogen cylinder or tank is not necessary. The system may or may not include a chilling or refrigeration unit capable of cooling the system components and beverage concentrate therein to a temperature less than ambient or room temperature. However, if the cooling capability is not included in the system provision to maintain the beverage concentrate in a cooled state may be made according to methods known to one of ordinary skill in the art.

The self-contained unit provides a user friendly and convenient chilled gas infused beverage preparation and dispensing unit especially suited for coffee bars, cafeterias, restaurants and other commercial establishments where beverages are served. In a special embodiment the present invention provides a kit of the above described components that includes a mounting panel housing which attaches to a wall or panel and mounts some or all of the system components to the wall.

The chilling or refrigeration system is capable to cool the system and/or the beverage concentrate therein to approximately 36° F. although the choice of temperature will be dependent upon the beverage being handled in the system and the flavor and appearance sought. Chilling or refrigeration systems suitable for the system of the present invention are commercially available. One particularly preferred system is an IOWA ROTO CAST "BREEZER" cylinder shaped refrigeration unit that may conveniently contain the components of the system.

The nitrogen is supplied via a gas regulator valve through a pressure rated supply line to the liquid/gas contactor membrane unit. The pressure of the water pumped into the liquid/gas contactor membrane unit and the pressure of the $N_2$ or $N_2/CO_2$ gas in the liquid/gas contactor membrane unit may be controlled independently of one another.

The diaphragm pump may be any appropriately sized diaphragm pump constructed for transfer of liquids for human consumption. Pumps suitable for this use are commercially available and as one example, a "SHURFLO BEER ACE" diaphragm pump may be noted.

A check valve is located in the $N_2$ feed line to the liquid/gas contactor membrane unit to prevent liquid "backflow" from the liquid/gas contactor membrane unit to the nitrogen generator.

The liquid/gas contactor membrane unit is any suitable membrane unit containing hollow fibers such that $N_2$ or $N_2/CO_2$ mixture gas supplied to the liquid/gas contactor membrane unit contacts the water via passage through a gas permeable membrane and is dissolved and/or dispersed into the water to form a $N_2$ or $N_2/CO_2$ infused water feed.

Figure 6:
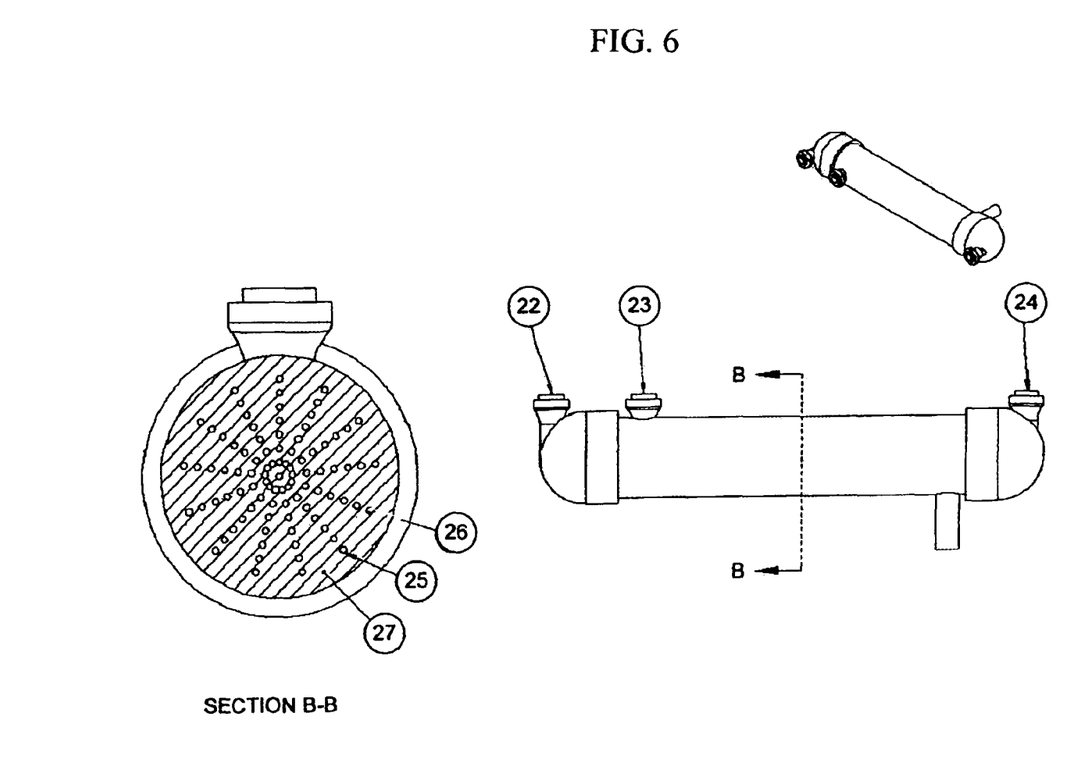
FIG. 6 is a drawing of a nitrogen gas liquid contactor unit according to an embodiment of the invention.

In general description, a liquid/gas contactor membrane unit may be constructed of a cylindrical tube containing hollow fiber membranes. Water is pumped into the space about the exterior of the hollow membranes. $N_2$ or $N_2/CO_2$ gas at a set pressure as determined by the supply regulator is passed into the interior of the hollow fiber membrane from where it permeates through the membrane and the permeate $N_2$ or $N_2/CO_2$ contacts the water on the exterior of the membrane and infuses into the water. A schematic diagram of an example of a liquid/gas contactor membrane unit is shown in FIG. 6. As indicated in the cross-sectional view B-B the contactor unit contains a series of hollow fiber membranes (25) arranged within a solid casing (26) and surrounded by fluid space (27). Liquid/gas contactor units are conventionally known and any unit which provides for gas-liquid contact across a permeable membrane may be suitably employed. In one embodiment of FIG. 6, the $N_2$ is passed through the hollow membranes while the water is passed through the fluid space surrounding the hollow fiber membranes. However, it is also possible to pass the water through the hollow fiber membranes while passing the $N_2$ through the fluid space. Variation and control of the gas pressure in the interior of the hollow fiber membrane relative to the pressure of the water on the exterior of the hollow fiber membrane allows for differing degrees of gas infusion into the water.

The gas infused water (Nitro water) is transported from the liquid/gas contactor membrane through the flow controlling needle valve or Brix valve such as for example, a Brix Block® unit and then through a back check valve to the liquid mixing point where the nitrogen infused water is mixed with the beverage concentrate.

Simultaneously, the beverage concentrate is pumped from the bag-in-box container by the diaphragm pimp directly to a separate beverage concentrate flow controlling needle valve, preferably a Brix Block® unit and then through a back check valve to the liquid mixing point.

The structure of the liquid mixing point may be of any configuration which leads to complete mixing of the nitrogen infused water and the beverage concentrate and may be as simple in design as a "Y" structure where the two lines fuse to one line or may be a more sophisticated passive liquid mixing unit as is well known in the art.

The flow rate and relative proportion of beverage concentrate and nitrogen infused water which enters the mixing point may be controlled by adjustment of the pressure from each of the diaphragm pumps and by adjustment of the flow through each of the flow controlling needle valves.

The nitrogen infused beverage obtained at the liquid mixing point is retained under pressure and moves toward the dispense tower equipped with a beverage faucet. In a preferred embodiment, the beverage faucet is a slow pour faucet that dispenses the chilled gas infused beverage at a rate of from 0.1 to 5 ounces per second, preferably from 0.5 to 3 ounces per second and most preferably from 0.8 to 1.2 ounces per second. This effect and dispense rate may be further enhanced by insertion of a restrictor nozzle in the tip of the faucet as previously described.

Importantly, the nitrogen infused beverage in the beverage line between the mixing point and the dispense faucet is maintained under a positive pressure even during dispense of the nitrogen infused beverage through the faucet.

In another embodiment, the present invention provides a method for preparing and dispensing a chilled gas infused beverage from a system of the present invention. The method comprises transferring a beverage concentrate from the bag-in-box container through the first flow controlling needle valve through the first back check valve to the liquid mixing point under pressure from the first diaphragm pump, simultaneously conveying water from the water supply through the liquid side of the liquid/gas contactor membrane unit under pressure from the second diaphragm pump and supplying the nitrogen gas at a pressure of from 20 to 70 psi to a gas side of the liquid/gas contactor membrane unit;

generating nitrogen from ambient air by compressing the air and separating nitrogen from the compressed air in a nitrogen membrane separator;

storing the generated nitrogen in a nitrogen storage unit under a pressure sufficient to operate a liquid gas contactor;

supplying the nitrogen from the nitrogen storage unit to the liquid/gas contactor;

infusing the nitrogen gas into the water across the membrane of the liquid/gas contactor;

further conveying the nitrogen infused water from the liquid/gas contactor through the second flow controlling needle valve through the second back check valve to the liquid mixing point;

mixing the beverage concentrate and nitrogen infused water at the liquid mixing point to obtain the nitrogen infused beverage;

supplying the nitrogen infused beverage under pressure to the beverage faucet; and dispensing the nitrogen infused beverage through the beverage faucet at a controlled rate to a receiver;

wherein the volume and pressure of the beverage concentrate and nitrogen infused water combined at the liquid mixing point are controlled by the first and second flow controlling ejectors respectively, and during the dispense of the nitrogen infused beverage, pressure is retained on the nitrogen infused beverage in the beverage line from the mixing point to the faucet.

In one preferred embodiment the beverage concentrate is coffee that is cooled to a temperature of 30 to 40° F., preferably 32 to 38° F. and most preferably, 34 to 37° F. Further, when the beverage is coffee the $N_2$ pressure in the liquid/gas contactor membrane unit is from 20 to 70 psi and the $N_2$ content in the infused chilled coffee obtained when mixed with the infused water at the liquid mixing point is from 20 to 80 ppm, preferably 30 to 60 ppm and most preferable 40 to 50 ppm.

The effect of the slow dispensing of the slow pour faucet is such that upon release from the system and flow to the receiver such as a serving glass, $N_2$ gas escapes from the chilled coffee or other infused beverage as it cascades to the glass and results in the appearance of a head of foam or froth on the surface of the beverage providing a flavor, aroma and appearance unique to the product obtained according to the present invention.

Diaphragm pumps are conventionally employed in industry for the pumping of beer, soda and other beverages, especially because such pumps are compatible with carbonated as well as non-carbonated liquids. Although utility of a diaphragm pump has been disclosed in these embodiments, it may be possible to employ other pumps suitable for liquids intended for human consumption.

The relative pressure of the $N_2$ gas in the liquid/gas contactor membrane unit and the pressure of the water from the diaphragm pump in the liquid/gas contactor membrane unit may be varied in order to impart more unique appearance and possibly flavor enhancement to the dispensed chilled beverage obtained at the liquid mixing point. The ratio of the $N_2$ feed pressure to the liquid pressure of the water in the liquid/gas contactor membrane unit may be from 20/1 to 1/20.

One of ordinary skill may learn the effect of variation of the ratio of the $N_2$ gas feed pressure to the liquid pressure of the water in the liquid/gas contactor membrane unit on properties of the dispensed chilled beverage through experimentation and adjust the settings as learned to obtain a $N_2$ infused chilled beverage having unique flavor, aroma and appearance. This study may also include the control of each of the flow controlling ejectors and relative mixing proportions.

In one embodiment the volume ratio of the beverage concentrate to nitrogen infused water mixed at the liquid mixing point may be from 1/10 to 10/1, preferably 1/5 to 5/1, and most preferable, 2/1 to 1/2. These ratios include all subranges and values within the described ranges.

In a further embodiment, the system may further contain a blast chiller unit, wherein a hot liquid such as brewed coffee concentrate or tea concentrate is first rapidly chilled or superchilled to 40° F. or lower and then charged to the bag-in-box container. Such rapid chill may serve to further enhance the flavor and aroma of the $N_2$ or $N_2/CO_2$ infused chilled beverage when mixed with the nitrogen infused water and dispensed to a drinking glass or other receiver.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A self-contained dispense system for preparation and dispensation of a specialty nitrogen infused beverage, comprising as components:

means for infusing nitrogen into a liquid to provide a nitrogen infused liquid, wherein the nitrogen infused liquid is the nitrogen infused beverage or is used to prepare the nitrogen infused beverage;

means to dispense the nitrogen infused beverage; and a system to continuously supply nitrogen gas to the means for infusing nitrogen, wherein the system to supply nitrogen gas comprises:
- a compressed air feed;
- a nitrogen membrane separator;
- a nitrogen storage unit;
- a pressure control unit; and
- a release valve for nitrogen from the nitrogen storage unit, wherein a foot print of the system to supply nitrogen gas is less than four square feet, a height of the system to supply nitrogen gas is less than one foot, and a volume of the nitrogen storage unit is from 10 to 100 cubic inches.

2. The self-contained dispense system of claim 1, wherein a pressure of gas of the nitrogen storage unit is from 10 to 100 psi.

3. The self-contained dispense system of claim 1, further comprising a mounting panel and/or housing to arrange at least one of the components.

4. The self-contained dispense system of claim 3, wherein the mounting panel is a wall mount panel and the system is mounted to a wall.

5. The self-contained dispense system of claim 3, wherein the components are arranged in a housing such that the system stands on a floor or stands on a countertop.

6. The self-contained dispense system of claim 3, wherein some components are arranged on a wall panel and the others arranged in a housing on a floor or on a countertop.

7. The self-contained dispense system of claim 3, wherein the system further comprises a refrigeration unit.

8. The self-contained dispense system of claim 3, wherein the means to dispense the nitrogen infused beverage comprises at least one of a restrictor plate and a restrictor nozzle.

9. The self-contained dispense system of claim 3, wherein the means to dispense the nitrogen infused beverage is a slow pour beverage faucet that dispenses the specialty nitrogen infused beverage at a rate of from 0.1 to 5 ounces per second.

10. The self-contained dispense system of claim 3, wherein the system comprises a beverage concentrate container having a volume of from 1 gallon to 10 gallons.

* * * * *